United States Patent
Shimoi et al.

(10) Patent No.: US 6,423,235 B1
(45) Date of Patent: Jul. 23, 2002

(54) COLUMN GAS-LIQUID CONTACTING APPARATUS AND ITS USE THEREOF

(75) Inventors: Yoichi Shimoi; Junichi Goda, both of Kanagawa; Takio Adachi, Saitama, all of (JP)

(73) Assignee: Nittetu Chemical Engineering Ltd., Tokyo (JP)

( * ) Notice: Subject to any disclaimer, the term of this patent is extended or adjusted under 35 U.S.C. 154(b) by 0 days.

(21) Appl. No.: 09/570,928

(22) Filed: May 15, 2000

(30) Foreign Application Priority Data

| Aug. 18, 1999 | (JP) | ............................................. 11-267579 |
| Oct. 25, 1999 | (JP) | ............................................. 11-338321 |
| Feb. 18, 2000 | (JP) | ......................................... 2000-104078 |

(51) Int. Cl.$^7$ ................................................. C02F 1/78
(52) U.S. Cl. .......................... 210/760; 210/908; 95/156; 95/159; 95/168; 261/148; 261/DIG. 42
(58) Field of Search ................................ 210/760, 908; 95/156, 159, 168; 261/148, 75, DIG. 42, DIG. 72

(56) References Cited

U.S. PATENT DOCUMENTS

| 3,944,402 A | * | 3/1976 | Cheremisinoff |
| 4,294,676 A | * | 10/1981 | Boutin et al. |
| 4,612,021 A | * | 9/1986 | Bland et al. |
| 4,820,455 A | * | 4/1989 | Kunesh et al. |
| 5,069,830 A | * | 12/1991 | Moore et al. |
| 5,286,466 A | * | 2/1994 | Hardison |
| 5,387,377 A | * | 2/1995 | Chuang |
| 5,531,901 A | * | 7/1996 | Miyabe et al. |
| 5,843,307 A | * | 12/1998 | Faivre et al. |

* cited by examiner

*Primary Examiner*—Betsey Morrison Hoey
(74) *Attorney, Agent, or Firm*—Oblon, Spivak, McClelland, Maier & Neustadt, P.C.

(57) ABSTRACT

A gas-liquid contacting apparatus of a column system, comprising a column having an inlet for introducing a liquid to be treated and an outlet for a discharged gas in an upper part thereof, and an inlet for introducing a gas and an outlet for a treated liquid after gas-liquid contact in a lower part thereof, and at least two units comprising a packing material or a wetted wall structure, said units being separated by a gas back mixing preventer plate between the upper and lower parts, wherein the liquid introduced and the gas introduced are brought into countercurrent contact while keeping the gas phase as a continuous phase; and a process for producing an ozone liquid, a process for oxidizing an organic substance in a liquid, a process for removing a gas dissolved in a liquid, a process for treating a volatile substance in a liquid, a process for dissolving a gas into a liquid, each using the same.

21 Claims, 4 Drawing Sheets

COLUMN GAS-LIQUID CONTACTING APPARATUS AND ITS USE THEREOF

BACKGROUND OF THE INVENTION

1. Field of the Invention

The present invention relates to a gas-liquid contacting apparatus of a column system for bringing a gas into contact with a liquid. Furthermore, the present invention relates to a process for producing ozone water and a process for oxidizing an organic substance with ozone, each using the apparatus. Moreover, the present invention relates to a process for removing a gas dissolved in a liquid using the apparatus. Also, the present invention relates to a process for treating a volatile substance in a liquid using the apparatus.

2. Discussion of the Background

Known gas-liquid contacting apparatus include spray columns, wetted wall columns, packed columns, and plate columns (hereinafter referred to as "column gas-liquid contacting apparatus"), and further include ejectors, bubbling vessels, and static mixers (hereinafter referred to as "bubbling gas-liquid contacting apparatus"). The packed columns are representative. Conventionally, the packed columns in most cases have been used for treating gases and, hence, many of these have been used for the purpose of gas cleaning. Typical examples of the gas cleaning are air pollution control processes represented by flue gas desulfurization. In such cases, an important factor in design is how to treat a large quantity of a gas to be treated. However, since too large a gas amount results in a phenomenon in which the liquid is prevented from descending, i.e., the so-called flooding, and in an increased blower operating cost, an appropriate gas load is selected. Generally, employed values of this gas load are from 1 to 2 m/sec in terms of superficial gas velocity u obtained through a density correction.

Generally, a gas velocity U for a packed column is the velocity of a gas which is passing through the vacant column, and has no relation with the voidage which is the volume calculated by subtracting the volume occupied by the packing.

Various gases which are different in density ($\rho$) exist, ranging from light gases, such as hydrogen (molecular weight=2), and intermediate gases, such as air (molecular weight=29), to heavy gases, such as chlorine (molecular weight=71) Even air and steam, which are the most common gases for packed columns, each has considerably different densities depending on pressure and temperature Even when such various gases having different densities have the same gas velocity U, they differ in kinetic energy.

Consequently, the velocities of gases having the same kinetic energy can be expressed in terms of u which is the gas velocity corrected with density and is defined by the following equation (1), and gases having the same value of u have the same kinetic energy regardless of their densities:

$$u = U \sqrt{\frac{\rho \; (kg/m^3)}{1.2 \; (kg/m^3)}} \; (m/sec) \qquad (1)$$

In equation (1), the numeral 1.2 indicates the density of air at normal temperature and pressure, i.e., 1.2 kg/m³. Using this numeral to convert the densities of gases having various densities into dimensionless numbers, velocities of these gases each can be expressed in terms of the velocity of air at normal temperature and pressure.

In the conventional column gas-liquid contacting apparatus described above, the gas velocities employed have been in the range of from 1 to 2 m/sec in terms of the density-corrected superficial gas velocity u. These apparatus are unsuitable for operations where the gas amount is smaller than the lower limit. Specifically, gas velocities in the range of 0.1<u<1 m/sec are undesirable from the standpoint of profitability, while gas velocities of u<0.1 m/sec are undesirable from the standpoint of performance.

Recently, ozone has been utilized in the various fields instead of chlorine etc. which had been used. Ozone water is used for cleaning of silicon wafers and liquid crystals in electronic industry, sterilization of production apparatus and instruments in the filed of foods, sterilization of vegetables, medical instruments, swimming pool water, and other applications. Also, gas-liquid contacting reactions with ozone gas is applicable to the oxidative decomposition of organic substances in water, oxidative decomposition of COD substances in waste water, decoloring of colored waste water, bleaching of pulps in the pulp industry, and the like. Furthermore, ozone is often used as ozone water in which ozone is dissolved in water as well as gaseous ozone.

Bubbling vessels, ejectors, packed columns and the like are known as ordinary equipment for producing ozone water. However, the efficiency of utilizing ozone is low, and the concentration of ozone water is limited.

Furthermore, the presence of dissolved oxygen in water to be fed to a boiler or in cooling water causes corrosion in the apparatus, pipings, and the like. Accordingly, techniques for chemically or physically removing the oxygen dissolved in the water have been used from long ago.

Also, with respect to cleaning water for use in semiconductor production, attempts are being made to diminish the oxygen dissolved therein due to that the dissolved oxygen produces adverse influences.

Known techniques for removing dissolved oxygen from water include addition of a reducing agent, a contacting with hydrogen in the presence of a catalyst, vacuum degassing under heating, nitrogen gas bubbling, removal with a separatory membrane, and the like.

However, according to the conventional removing processes, a large amount of a dispersion gas is required, and a complicated equipment is required for carrying out the reaction in vacuo under heating. Thus, an effective and simple apparatus using a packed column is not known.

Stripping columns according to a packed bed system or a plate system are conventionally known as means for removing a volatile substance from waste water by stripping. The conventional packed bed stripping columns necessitate a sufficient linear gas velocity for the countercurrent contact of a liquid to be treated with a purge gas and necessitate an exceedingly large stripping gas amount for the stripping of a highly volatile substance.

Therefore, the concentration of the volatile substance in the gas phase is insufficient as compared with that in the liquid phase. The resultant stripping gas containing the volatile substance is treated either with an adsorbent, such as activated carbon or the like, to recover the volatile substance or by incineration. In the latter case, the stripping gas should be burned in a large quantity. Consequently, this technique is economically disadvantageous.

Moreover, since discharged gases have no regulations concerning such volatile substances unlike waste water, there have frequently been cases where waste water is treated by mere exposure to air (air stripping) to discharge the stripped volatile substances as they are into the air.

Recently, there is a fear concerning influences on the human body of volatile substances or endocrine disrupters represented by benzene and toluene, volatile organic halogen substances represented by dichloromethane and chloroform, and analogues thereof. Despite these circumstances, no process has been obtained which is effective in recovering such substances from waste water. Consequently, for removing such substances from waste water, processes necessitating a large amount of energy have been used, such as the process comprising stripping with a large amount of air and recovery by adsorption and the process comprising stripping and decomposition by incineration. Alternatively, a process comprising subjecting waste water to air stripping and discharging the stripped volatile substance into the air has been used due to that the emission of such substances is not regulated by the law relating to air pollution control.

SUMMARY OF THE INVENTION

An object of the present invention is to provide an apparatus in which gas-liquid contacting can be efficiently carried out at a low gas feed rate.

Another object of the present invention is to provide an apparatus which is intended not only to be a basic apparatus usable in gas-liquid contacting operations in various applications, but also to have a simple structure.

Also, an object of the present invention is to provide a process for producing ozone water, a process for oxidizing an organic substance with ozone in a liquid, and a simple apparatus used therefor.

Furthermore, an object of the invention is to provide a novel process for removing a gas dissolved in a liquid using a packed column unlike conventional degassing processes, and a simple apparatus used therefor.

Moreover, an object of the invention is to provide a process by which a gas dissolved in a liquid is removed and, simultaneously therewith, a gas different from the removed dissolved gas can be dissolved in the liquid at a high concentration, and a simple apparatus used therefor.

Still moreover, an object of the present invention is to provide an effective and economical process of treatment for stripping highly volatile substances, such as benzene, toluene, dichloromethane, chloroform, and the like, among many organic substances, from liquids to remove or recover the substances, and a simple apparatus used therefor.

Still furthermore, an object of the present invention is to provide a process by which even a liquid containing a volatile substance at a low concentration can be efficiently stripped to concentrate the volatile substance, and a simple apparatus used therefor.

The present invention relates to the following (1) to (15):
(1) A gas-liquid contacting apparatus of a column system, comprising
   a column having an inlet for introducing a liquid to be treated and an outlet for a discharged gas in an upper part thereof, and an inlet for introducing a gas and an outlet for a treated liquid after gas-liquid contact in a lower part thereof, and
   at least two units comprising a packing material or a wetted wall structure, said units being separated by a gas back mixing preventer plate between the upper and lower parts,
   wherein the liquid introduced and the gas introduced are brought into countercurrent contact while keeping the gas phase as a continuous phase.
(2) The apparatus according to the above (1), wherein
   the gas back mixing preventer plates are installed at an interval H of 2 m or less,
   the ratio H/D is 5 or less, wherein D represents a diameter of the column, and
   the gas back mixing preventer plates have a gas passage hole in an amount of 5% or less, in terms of the percentage of the total area of all gas passage holes, to the cross-sectional area of the column.
(3) The apparatus according to the above (1), wherein the unit comprises a packing material (hereinafter referred to as a "packed bed").
(4) The apparatus according to the above (1), wherein
   the gas back mixing preventer plate is a plate comprising gas passage holes and liquid passage holes, and
   the packing material is supported by the gas back mixing preventer plate.
(5) The apparatus according to the above (1), wherein
   the gas back mixing preventer plate is a plate comprising gas passage holes and liquid passage holes, and
   the packing material is supported by a support other than the gas back mixing preventer plate.
(6) A process for producing an ozone liquid, comprising
   introducing a liquid into an upper part of a column comprising at least two units comprising a packing material or a wetted wall structure, said units being separated by a gas back mixing preventer plate,
   introducing an ozone gas into a lower part of the column, and
   bringing the liquid into countercurrent contact with the ozone gas while keeping the gas phase as a continuous phase.
(7) The process according to the above (6), wherein the liquid is pure water or ultra pure water.
(8) A process for oxidizing an organic substance in a liquid, comprising
   introducing a liquid to be treated into an upper part of a column comprising at least two units comprising a packing material or a wetted wall structure, said units being separated by a gas back mixing preventer plate,
   introducing an ozone gas into a lower part of the column, and
   bringing the liquid into countercurrent contact with the ozone gas while keeping the gas phase as a continuous phase.
(9) A process for removing a gas dissolved in a liquid, comprising
   introducing a liquid to be treated into an upper part of a column comprising at least two units comprising a packing material or a wetted wall structure, said units being separated by a gas back mixing preventer plate,
   introducing a purge gas into a lower part of the column, and
   bringing the liquid into countercurrent contact with the purge gas while keeping the gas phase as a continuous phase to remove a gas dissolved in the liquid.
(10) The process according to the above (9), wherein
   the gas dissolved is oxygen, and
   the purge gas is nitrogen and/or carbon dioxide.
(11) A process for removing a gas dissolved in a liquid, comprising
   introducing a liquid to be treated into an upper part of a column comprising at least two units comprising a packing material or a wetted wall structure, said units being separated by a gas back mixing preventer plate,
   introducing a purge gas into a lower part of the column, and bringing the liquid into countercurrent contact with the purge gas while keeping the gas phase as a continuous phase to remove a gas dissolved in the liquid and dissolve the purge gas in the liquid.

(12) The process according to the above (11), wherein the gas dissolved in the liquid is oxygen, and the purge gas is carbon dioxide or a combination of carbon dioxide and nitrogen.

(13) A process for treating a volatile substance in a liquid, comprising introducing a liquid to be treated into an upper part of a column comprising at least two units comprising a packing material or a wetted wall structure, said units being separated by a gas back mixing preventer plate, introducing a purge gas into a lower part of the column, and bringing the liquid into countercurrent contact with the purge gas while keeping the gas phase as a continuous phase to strip the volatile substance in the liquid.

(14) The process according to the above (13), wherein the volatile substance is a volatile organic substance.

(15) The process according to the above (13), further comprising cooling and condensing a stripping vapor containing the stripped volatile substance, and concentrating and recovering the volatile substance, wherein the purge gas is water vapor.

Symbols used in the drawings are explained below.

1: column 2, 2': gas back mixing preventer plate

3: packed bed

4: inlet for introducing a liquid to be treated

5: outlet for a discharged gas

6: inlet for introducing a gas

7: outlet for a treated liquid

10: gas back mixing preventer plate

11: gas riser

12: liquid passage hole

13: gas passage hole

15: tube plate

16: wetted wall tube

20: packed column

21: tank for a liquid to be treated

22: tank for a treated liquid

23: purge gas (water vapor)

24: tank for a recovered liquid

25: pump for transferring a liquid to be treated 26, 27, 28: heat exchanger

DETAILED DESCRIPTION OF THE INVENTION

In this description, the term "gas" means a gas (G) in a wide sense including vapor (V), such as water vapor and the like. Also, in the following equations, the symbol "G" includes "V".

The reasons for the low efficiencies of conventional bubbling gas-liquid contacting apparatus operated at a low gas feed rate may be as follows.

The conventional gas-liquid contacting apparatus frequently used in operations where the gas amount is small, as in the production of ozone water having a low ozone concentration, are bubbling gas-liquid contacting apparatus, such as ejectors, bubbling vessels, and the like, due to that fine bubbles can be formed and the apparatus are compact. However, such conventional bubbling gas-liquid contacting apparatus have reduced performances at a small gas amount due to that the treatments in these apparatus are conducted by a one-step, cocurrent or tank-flow operation, and that bubbles constitute a dispersed phase so that the mass transfer rate ($K_L a$) is low.

When a gas dissolves in liquid, components of the gas move from the gas phase through bubble/liquid interfaces to the liquid phase. Absorption thus occurs. This movement is quantitatively or numerically expressed by a mass transfer rate ($K_L a$).

Symbol "a" in that formula is the area of bubble/liquid interfaces with unit of $m^2/m^3$. To increase the area of bubbles means to increase $K_L a$. In designing a bubbling vessel or ejector, a point which should be taken in account has been how to form fine bubbles or how to design an apparatus having a large value of $K_L a$. However, in apparatus in which the gas feed rate is low, it is difficult to heighten the degree of gas absorption even when exceedingly fine bubbles are formed. This is because the absolute amount of bubbles actually present in the system is originally small.

The second reason relates to gas-liquid equilibrium.

A gas-liquid equilibrium holds for the concentration of a specific gas in liquid and the concentration of the gas in the gas phase. As is well known, this relationship is expressed by Henry's law.

For example, when the ozone concentration in ozone water is increased 10 times from 1 ppm to 10 ppm, the ozone concentration in the gas also increases 10 times according to Henry's law. However, in bubbling vessels or ejectors, the gas is discharged while being equilibrated with the ozone concentration in the water because the treatment in the apparatus is carried out in one step and the gas passes therethrough only once. Namely, the ozone concentration in the discharged gas increases as that in the ozone water increases. As a result, the degree of ozone absorption (ozone recovery rate) for the whole operation becomes worse.

However, for obtaining an equilibrium concentration, it is necessary to use an apparatus in which $K_L a$ is infinite. Virtually, however, an equilibrium value cannot be reached. The recovery of a gas, such as ozone or the like, is hence below the theoretical value. This is observed in data obtained with actual apparatus.

As described above, it is difficult to expect bubbling vessels or ejectors to have a satisfactory gas-liquid contacting efficiency when the gas amount is small. Consequently, when the two phases are replaced with each other so that the gas constitutes a continuous phase, then the liquid constitutes a dispersed phase to be always surrounded by the gas and it is possible to increase $K_L a$.

A representative example of such apparatus in which a gas constitutes a continuous phase is the packed column. When a gas-liquid contacting operation is conducted in a packed column, the inside of the column is filled with the gas and the liquid descends therethrough as a dispersed phase. In this constitution, the area of gas/liquid interfaces through which gas absorption occurs can be increased.

Packed columns are thought to be suitable for the absorption or stripping of gases because countercurrent operations using a gas as a continuous phase are possible therein. However, use of packed columns arouses another problem.

Namely, when the gas amount is small, a phenomenon occurs in which the liquid entrains the gas to cause back mixing, making it difficult to realize a countercurrent operation.

This back mixing phenomenon can be easily understood when the packed column is taken as a multiventuri. The apparatus called an ejector or venturi is known as an aspirator in laboratories. These apparatus all utilize the same principle, i.e., the principle in which a high-speed fluid generates a negative pressure and which is known as Bernoulli's theorem.

In general packed-column operations, the gas velocities are 1 m/sec or more. At such gas amounts, the entrainment of a gas by a liquid is relatively negligibly slight, though it occurs, due to that the kinetic energy of the gas is high. The flow of the gas under such conditions is virtually a piston flow and a countercurrent operation can be realized. In contrast, when the gas amount is so small that the gas is in a nearly stationary state or has a low velocity, the gas is entrained by the liquid and comes to descend due to the movement of the liquid. This phenomenon is back mixing. This back mixing results in an exceedingly small difference in gas concentration in vertical directions.

A countercurrent operation is an important operation for enhancing a driving force in mass transfer, heat transfer, or the like. However, back mixing prevents the countercurrent and reduces the efficiency of gas-liquid contacting.

In the present invention, back mixing, which is a factor contributing to the prevention of gas-liquid countercurrent contacting, can be prevented even at low gas flow rates by installing gas back mixing preventer plates in a column.

In the packed column gas-liquid contacting apparatus, the density-corrected superficial gas velocity (u) is preferably 0.1 m/sec or less. Although values of u which are corrected with gas density are used for expressing the pressure losses by a packed material, they serve also as indexes indicating the degree in which a gas fed at a low rate which is a subject of the present invention is vertically mixed by the movement of a liquid in a packed column. When the gas amount is 0.1 m/sec or less in terms of u defined by equation (1), the degree of gas mixing in the vertical direction is high. Although the lower limit thereof is not particularly limited, it is preferably 0.00001 m/sec.

Plates (gas back mixing preventer plates) each having holes (liquid passage holes) enabling a liquid to descend therethrough and holes (gas passage holes) enabling a gas to ascend therethrough are installed in a column in positions somewhere between the bottom and top of the column, in order to prevent the entrainment by liquid, i.e., back mixing, in gas-liquid contacting operations in the column. The gas passage holes usually are small holes formed so as to extend to above the liquid level. Since a gas is forcibly injected through the small holes, a liquid descends onto each sump while avoiding the small gas holes gas. After residing on the gas back mixing preventer plate for a while, the liquid passes through the liquid passage holes formed in the gas back mixing preventer plate and descends toward the lower packed beds. These holes in each plate are installed at a pitch of, e g., about 100 mm, preferably from 20 to 100 mm, so as to enable both the gas and the liquid to be evenly dispersed.

In designing the gas back mixing preventer plates, the following points concerning hole diameter should be taken in account. With respect to liquid passage holes, too small hole diameters result in an elevated liquid level to partly immerse the packing material. This immersion means a decrease in the effective surface area of the packing material constituting the packed bed, namely, it leads to a performance decrease. Too large hole diameters result in too low a liquid level, which adversely influences the even distribution of the liquid. The reason for this is as follows. In a column having a larger diameter, the liquid residing on each gas back mixing preventer plate has different depths in opposite positions in a peripheral area thereof due to a slight inclination of the column or the slightly imperfect horizontality of the plate. In this case, large liquid depths exert little influence, while small liquid depths are causative of uneven liquid distribution.

With respect to gas passage holes, on the other hand, too small hole diameters result in an increased pressure loss and, as a result, the liquid level ascends to such a degree as to counterbalance the pressure loss. Since the packing material is thus partly immersed in the liquid as in the case of too small liquid passage hole diameters, the effective surface area of the packing material decreases, i.e., the performance is reduced. Conversely, in case where the gas passage holes are too large, the liquid descends through these holes and entrains the gas. As a result, the effect of the gas back mixing preventer plates is impaired.

It is preferred that the gas passage holes be formed in gas risers so that a gas is evenly distributed throughout the packed beds and comes into satisfactory contact with a liquid. The gas passage holes are installed so that the directions in which the holes are open do not adversely influence gas-liquid contacting in the whole packed beds and that the gas does not take shortcuts.

The column gas-liquid contacting apparatus of the present invention will be explained by reference to the drawings.

Figure 1:
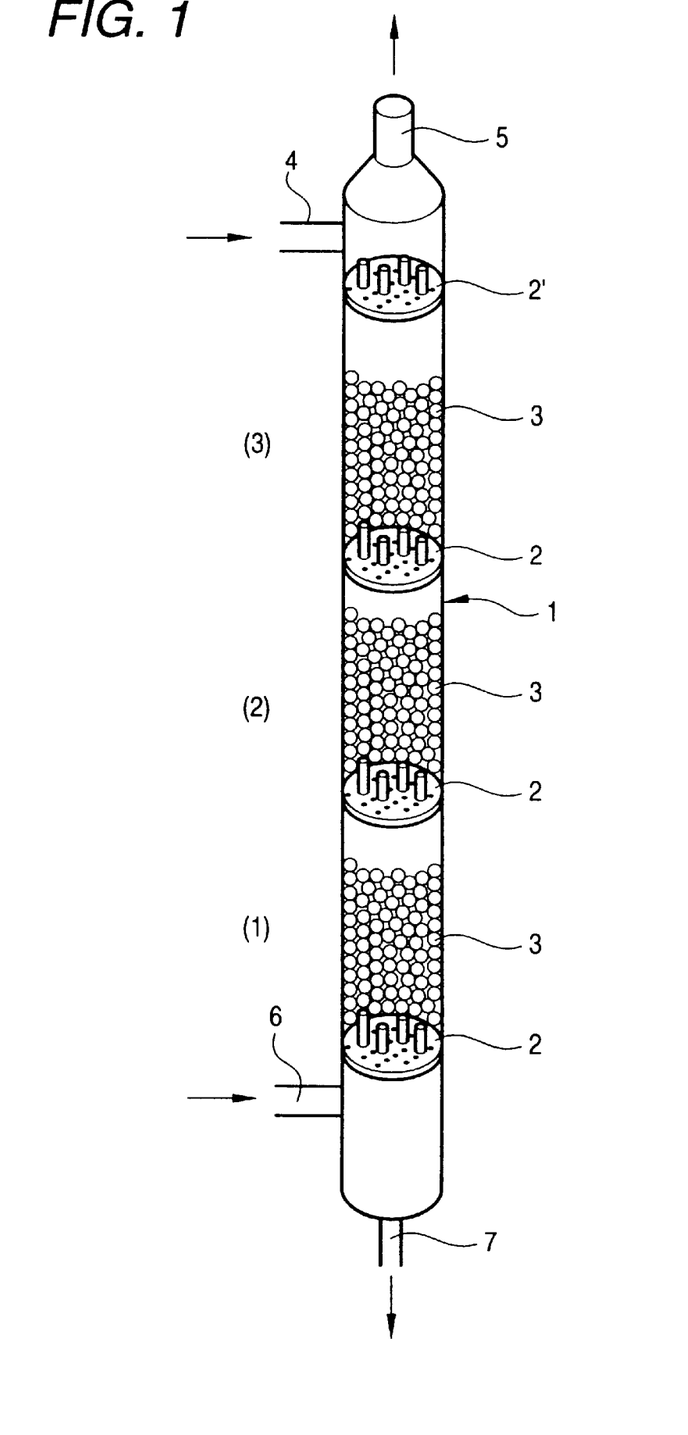
FIG. 1 is a view illustrating a basic constitution of an apparatus according to the present invention.

FIG. 1 is a view illustrating a basic constitution of the apparatus of the present invention. This apparatus comprises a column 1 having at least two packed beds 3 therein separated by a gas back mixing preventer plate 2. The column 1 has an inlet 4 for introducing a liquid to be treated and an outlet 5 for a discharged gas in an upper part thereof, and further has, in a lower part thereof, an inlet 6 for introducing a gas and an outlet 7 for a treated liquid after gas-liquid contacting.

In each gas back mixing preventer plate, the open rate of gas passage holes is preferably 5% or less in terms of the percentage of the total area of all gas passage holes based on the cross-sectional area of the column, so as to prevent back mixing and improve the efficiency of gas-liquid contacting.

A liquid to be treated is introduced into the column 1 through the inlet 4 for the liquid to be treated installed in an upper part of the column 1, while a gas is introduced through the inlet 6 for introducing the gas installed in a lower part of the column 1. The liquid and the gas are passed through the packed beds 3 in the column to bring into countercurrent contact with each other.

Elevating the pressure inside the column facilitates dissolution of the gas in the liquid. Also, gas-liquid contacting in the apparatus of the present invention can be conducted with pressurizing.

The material for the packed columns is not particularly limited so long as it is inactive to various reactions. Examples thereof include Teflon, stainless steel, and the like.

Figure 2:
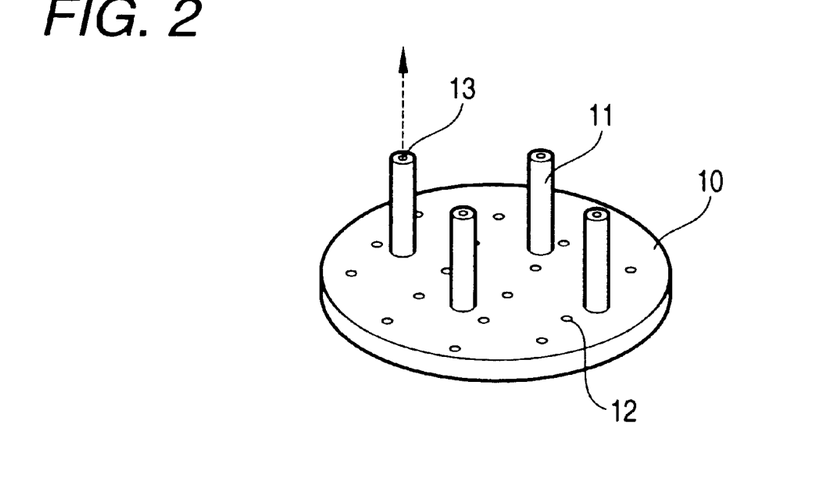
FIG. 2 is a view illustrating an example of a gas back mixing preventer plate having gas risers.

The gas back mixing preventer plates may be orifice plates, which are the simplest gas back mixing preventer plates and are produced by perforating a flat plate. However, use of orifice plates tends to result in insecure liquid/gas distribution due to that a gas and a liquid pass through the same holes. Consequently, the gas back mixing preventer plates for use in the present invention have gas risers so that a gas ascends through the gas risers and a liquid descends through liquid passage holes in order to secure distribution. An example of this gas back mixing preventer plate having gas risers is shown in FIG. 2. The gas back mixing preventer plate shown in the figure comprises a plate 10 which has liquid passage holes 12 and gas risers 11 installed thereon. The gas risers are hollow, and each has a through-hole having a diameter of several millimeters so as to permit a gas to pass therethrough. The liquid passage holes 12 for permitting a liquid to pass therethrough each has a slightly larger size than the gas riser openings. However, the sizes of these openings should not be construed as being limited to those values, and suitable opening sizes may be selected according to the purpose and conditions of use of the apparatus.

The gas back mixing preventer plates may be ones which each has gas passage holes and liquid passage holes and functions also as a support plate on which the packing is supported. Alternatively, the apparatus may have a constitution in which the gas back mixing preventer plates each has gas passage holes and liquid passage holes and the packing is supported on support plates which are not the gas back mixing preventer plates.

The gas back mixing preventer plates each is desirably designed so that the gas passage holes are located above the liquid passage holes and above the liquid level and that a gas is ejected in directions which enable the gas to be evenly distributed throughout the packed bed and come to satisfactory contact with a liquid.

There is no need of installing a gas back mixing preventer plate between the inlet 4 for a liquid to be treated installed in an upper part of the column 1 and the uppermost packed bed when the packed bed has a large volume. However, it is preferred to install in that position a gas back mixing preventer plate, whose shape may be the same as or different from that of the other back mixing preventer plates. An example thereof is the gas back mixing preventer plate 2' shown in FIG. 1. This gas back mixing preventer plate serves to homogeneously distribute a liquid to be treated to the surface of the packed bed. In place of it, another common liquid distributor, such as a pipe distributor and the like, may be used.

Figure 3:
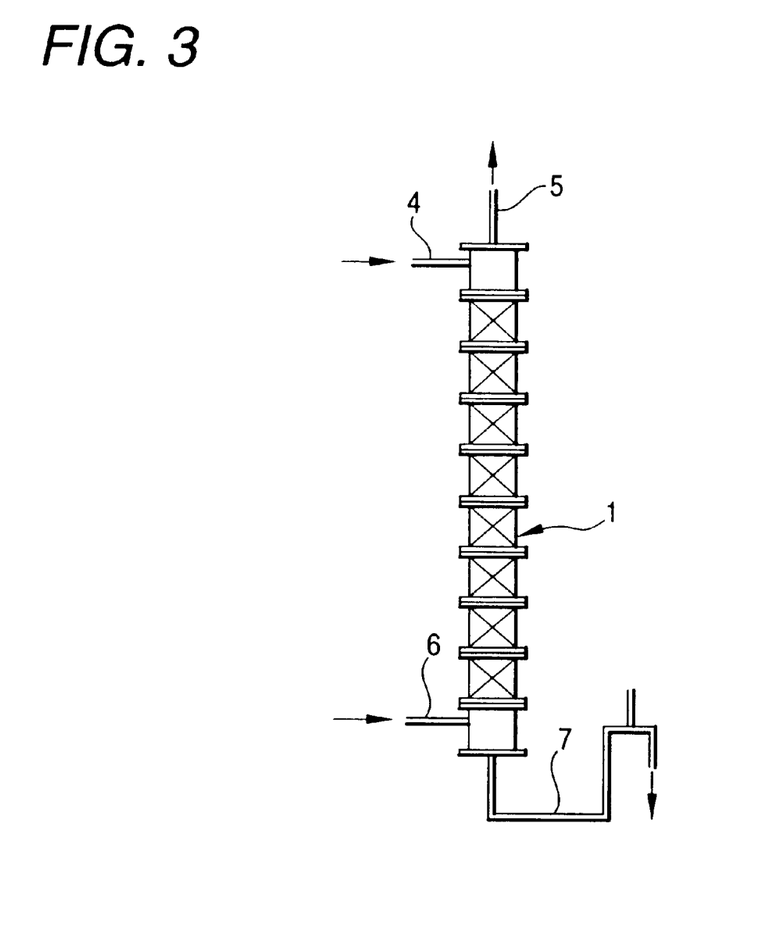
FIG. 3 is a view illustrating an appearance of an apparatus according to the present invention having eight packed beds.

The apparatus has at least two packed beds. The larger the number of packed beds, the higher the efficiency. Consequently, the number of packed beds is preferably 5 or more, more preferably 8 or more, most preferably 10 or more. FIG. 3 shows a diagrammatic view illustrating an appearance of an apparatus according to the present invention which has eight packed beds. Although the upper limit of the number of packed beds installed in the column is not basically limited, it may be suitably fixed according to purposes of use of the apparatus, restrictions imposed by an installation place, and profitability.

The packed beds may be constituted of random packing materials or structured packing materials. Examples thereof include Tellarette (trademark in Japan, manufactured by Nittetu Chemical Engineering Ltd.), Raschig Ring, Pall Ring, and the like. Such packing materials are filled as much as possible into each of the spaces of the packed bed separated by the gas back mixing preventer plate.

As stated above, such a packing material may be placed on the gas back mixing preventer plate 2, or may be supported on another support, such as perforated plates, support grids, or the like.

The gas-liquid contacting apparatus of the present invention may have a wetted wall structure in place of the packed beds 3 installed in the spaces separated by the gas back mixing preventer plate. In this case, the same effects can be produced, and the wetted wall structure is suitable for obtaining an increase of an absorption efficiency while removing an absorption heat by a refrigerant in absorption accompanied with a heat generation, such as water absorption of hydrochloric acid and the like. Consequently, it is a matter of course that the packed bed and the wetted wall structure may be used alone or in combination.

Figure 4:
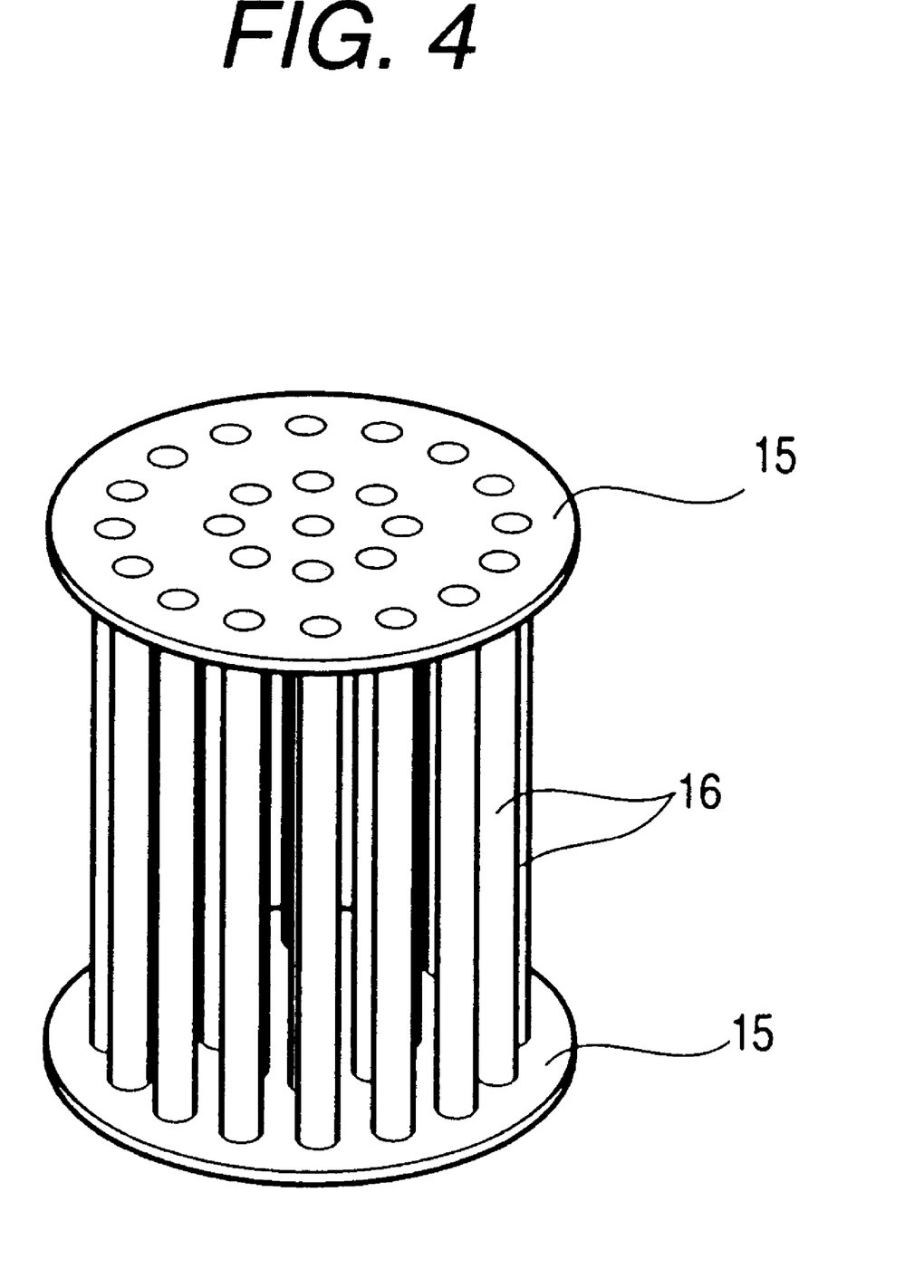
FIG. 4 is a view illustrating a wetted wall structure.

The term "wetted wall structure" as used herein means a member comprising two tube plates and many wetted wall tubes attached thereto, as in heat exchanges, like internal structures of existing wetted wall columns. An example thereof is shown in FIG. 4. This wetted wall structure comprises tube plates 15 and attached thereto wetted wall tubes 16 consisting of vertical cylindrical tubes. In the column 1, a liquid to be treated descends along the inner wall of each wetted wall tube 16 while forming a liquid film and comes into countercurrent contact with a gas ascending through the inside of the tube. It is preferred that a refrigerant descends outside of the wetted wall tubes descends to remove an absorption heat.

The vertical-direction interval at which gas back mixing preventer plates are installed is also important in determining the performance.

In ordinary packed columns, liquid redistributors are installed at such an interval that the proportion of the height of each packed bed H to the diameter of the packed column D, i.e., H/D, is 5 or more or the packed-bed height H is 10 m or less. However, such long intervals result in gas back mixing flows in operations in which the gas amount is small, leading to a reduced efficiency. Consequently, in the apparatus of the present invention, gas back mixing preventer plates are installed at an interval as short as possible. However, too short intervals at which gas back mixing preventer plates are installed are undesirable in that not only the packing is partly immersed in the liquid residing on the gas back mixing preventer plates and, as a result, the efficiency is reduced rather than improved, but also the equipment cost is high. In the present invention, gas back mixing preventer plates are therefore preferably installed at an interval H of 2 m or less, more preferably from 0.05 to 2 m, so that the ratio of the interval H to the column diameter D, H/D, is preferably 5 or less, more preferably from 0.05 to 5. Since the interval at which gas back mixing preventer plates are installed varies depending on the diameters of packed columns, it is preferred in the present invention to install the plates at such an interval that H/D is 5 or less, preferably around 3. For example, in the case of a packed column having a diameter of 2 m, the installation interval for gas back mixing preventer plates is preferably about 0.4 m. As the column diameter increases, the installation interval is increased. For example, in a column having a diameter of 0.3 m, gas back mixing preventer plates are preferably installed at an interval of from 0.6 to 1.5 m. However, the interval should be preferably from 0.05 to 2 m.

Devices apparently similar to the gas back mixing preventer plate for use in the present invention include a tray used for distillation and a liquid redistributor used in packed columns. However, these devices. are different in the following points from the gas back mixing preventer plates for use in the present invention.

The tray is thought to be the same as the plates for use in the present invention with respect to its function of preventing gas back mixing flows. However, in the tray, which is basically composed of vertically stacked bubbling vessels, a gas is injected from bubble caps and ascends as bubbles, i.e., as not a continuous phase but a dispersed phase, through a liquid residing on the tray. During the ascent, mass transfer occurs. Although the tray is effective in operations in which the gas (vapor) amount is large, it is impracticable in operations at a small gas amount, for which the present invention is intended to be used. This is due to that the tray, like bubbling vessels, has a small value of $K_L a$ in operations at small gas amount, and therefore, the mass transfer rate is exceedingly reduced therein to necessitate a considerable increase in the number of trays. Therefore, the tray is a device which is different from the gas back mixing preventer plates for use in the present invention.

The device for redistributing a liquid (liquid redistributor) for use in packed columns is also much similar in shape to the gas back mixing preventer plates. However, this device is intended to re-collect a liquid which has come to be mal-distributed, e.g., densely distributed by the wall, during the descent through a packed bed and to evenly redistribute the collected liquid to thereby maintain the function of the packed column. The redistributor is different purpose of installation from the gas back mixing preventer plates.

Therefore, the liquid redistributor are different in installation interval and the like from the gas back mixing preventer plates according to the present invention.

In the present invention, preferably, the gas back mixing preventer plates are installed in a shorter interval. Specifically, preferably, the gas back mixing preventer plates are installed at an interval of 2 m or less so that the ratio of the interval H to the column diameter D is 5 or less. With respect to the proportion of the total area of all gas passage holes to the cross-sectional area of the column (the open rate of gas passage holes), it should be from 10% or more, or 20% or more, in the liquid redistributor; on the other hand, it is preferably 5% or less, more preferably 3%, most preferably 0.01 to 3%, in the present invention. Furthermore, the liquid redistributor has a gas passage hole diameter of from 80 to 100 mm; on the other hand, the gas passage hole diameter in the present invention is preferably 15 mm or less, more preferably from 1 mm to 15 mm, and most preferably from 0.5 mm to 10 mm. As shown above, differences in purpose are reflected in such differences in the open rate of gas passage holes, etc.

The process for producing ozone water according to the present invention will be explained by reference to the drawings.

In the packed column, the liquid which is being treated is surrounded by ozone constituting a continuous phase, and therefore, the reaction is promptly completed. In this operation, the time period in which ozone resides in the packed column is about 1 hour, preferably about 30 minutes. It can be understood that this system employs an exceedingly smaller gas amount than that in operations of ordinary packed columns, in which the residence time is several seconds because the gas velocity therein is about 1 m/sec.

In such systems in which the gas amount is exceedingly small, the gas is thought to be in a stationary state. As a result, the gas is mixed upward and downward through the column to make a ozone gas homogeneous concentration. Consequently, this complete mixing makes a counter current prevented. Furthermore, part of the ozone gas takes shortcuts and is discharged, without the absorption or reaction, from the packed column to cause a loss. Thus, the percentage of ozone utilization in conventional ejectors and packed columns has been about 18% (for example, 10 to 20%). In contrast, by using the column apparatus of the present invention, ozone can be efficiently dissolved and the degree of ozone utilization can be greatly improved. Consequently, the apparatus of the present invention can make possible to be carried out absorption of ozone or reaction by ozone with much smaller number of ozonizers (ozone gas generators) than using conventional processes like the ejector or bubbling vessel.

In FIG. 1, a very small amount of an ozone gas produced by an ozonizer which is not shown therein is introduced into a column from an inlet 6 for introducing an ozone gas at a lower part thereof, the ozone gas is brought into contact with descending ozone water at a region (1) separated by a gas back mixing preventer plate 2 during ascending of the ozone through a packed bed 3 to increase the ozone concentration in ozone water, and the ozone water is taken out from an outlet 7. When the ozone water is descended through regions (2) and (3) separated by gas back mixing preventer plates 2 successively, water introduced from an inlet 4 at an upper part of the column is brought into countercurrent contact with ozone, and the ozone water is descended while increasing the ozone concentration in the ozone water, the ozone gas which has gone up in the column and has not been absorbed is discharged from an outlet 5 for a discharged gas. The ozone in the discharged can be treated using an ozone decomposition apparatus with conventional processes, such as activated carbon treatment, catalyst decomposition treatment, thermal decomposition treatment, and the like. However, in the present invention, the ozone concentration of the final gas discharged from the top of the column is very low due to that the remain of ozone in gas, most part of which has been already absorbed to produce ozone water, contacts with the fresh water introduced from the top of the column. Thus, the burden for degrading ozone is reduced.

It is a matter of course that in the apparatus of the present invention, not only ozone water having a high ozone concentration but also ozone water having a low ozone concentration can be produced by controlling the operation conditions.

An ozone treatment can be carried out basically in the same constitution as the above-described apparatus for producing ozone water. Specifically, in such an ozone treatment apparatus, water to be treated and an ozone gas are introduced into the upper part of the packed column and the lower part thereof, respectively, and the water is brought into countercurrent contact with the ozone gas. In the ozone treatment apparatus, organic substances contained in the liquid to be treated and substances decomposed by ozone can be efficiently treated and reduced in some cases.

In various industries, especially in semiconductor industries, organic substances, such as alcohols (e.g., isopropyl alcohol) and the like, are presently used in cleaning steps. Since waste water containing such organic substances are discharged, attempts are being made, for example, to oxidize the organic substances with intense ultraviolet rays to decompose them into carbonic acid gas and water. However, this technique has a problem concerning profitability due to that the power consumption is large.

Although oxidation with ozone water may be usable, this technique also has low profitability due to that the production of ozone water having a high ozone concentration with a conventional ejector results in an ozone recovery rate as low as 15% or below as explained in Example 1 below.

When the column gas-liquid contacting apparatus of the present invention is used as an ozone contactor, it is possible to economically decompose organic substances contained in liquids.

An apparatus of the present invention having the constitution shown in FIG. 3 is used in the following manner. A liquid to be treated containing an organic substance is introduced together with an oxidation accelerator into an upper part of the column. An ozone gas is introduced into a lower part of the column. While passing through the column, the liquid and the ozone react with each other in each of the packed beds separated by the gas back mixing preventer plate. As a result, the organic substance is decomposed.

It can be thought that when the organic substance completely reacts with an equivalent amount of ozone, free ozone is not discharged. Virtually, however, the reaction is completed only when free ozone remains. Consequently, the necessary ozone amount is the sum of the ozone consumed by the decomposition reaction and the free ozone discharged from the system.

When a gas dissolved in a liquid is removed with a packed column as in the present invention, use of an ordinary packed column as it is cannot give expected performances since the gas amount relative to the amount of the liquid to be treated is exceedingly small in this system. This is due to that, when the gas flow rate relative to the amount of the liquid to be treated is exceedingly low, then the gas descends by back mixing and this makes a countercurrent operation impossible.

Specifically, the back mixing occurs by the following mechanism. In a packed column, a liquid flows through the packing while the liquid descends and the gas is entrained, but this effect is almost negligible in general gas-liquid contacting operations due to the large gas amount. However, in a system in which the gas amount relative to the liquid amount is exceedingly small as in the case shown above, increase of the flow rate of the liquid to be treated causes the gas to descend, i.e., to undergo back mixing. As a result, the gas is mixed, and the purge gas concentration becomes even throughout the column. Namely, the countercurrent operation becomes virtually impossible. This tendency becomes severer with increasing packed-column diameter. Namely, gas mixing is more apt to occur in packed columns having a larger diameter.

In the present invention, the problem described above is eliminated by installing packed beds separated by a gas back mixing preventer plate in a column to bring a liquid to be treated and a purge gas into countercurrent contact with each other while keeping the gas phase as a continuous phase and being prevented from undergoing back mixing. As a result, a gas dissolved in the liquid can be efficiently removed.

The conditions in which the gas phase is kept as a continuous phase at the countercurrent contact between a liquid to be treated and a purge gas means, that when the liquid to be treated which is descending in the packed column passes through a packed bed, the liquid slides down the surface of the packing while forming a liquid film and the ascending purge gas constitutes a continuous phase. As a result, the gas-liquid contacting in the present invention occurs in such conditions, the liquid is efficiently contacted with the purge gas.

Another process for removing a gas dissolved in a liquid according to the present invention has basically the same constitution as the above-described process of removing a gas dissolved in a liquid according to the present invention. Namely, it comprises introducing a liquid to be treated and a purge gas into an upper part and a lower part, respectively, of the packed column and bringing the liquid into countercurrent contact with the purge gas. In this process, however, the, purge gas is dissolved in the liquid simultaneously with the removal of a gas dissolved in the liquid. Thus, the present invention includes a process for dissolving a gas into a liquid.

That is, this process of the present invention, in which a purge gas is used to remove or diminish a dissolved gas contained in a liquid to be treated, utilizes a phenomenon in which part of the gas used as a purge gas dissolves in the liquid. When there is a gas which is required to be positively dissolved in a liquid, this gas is used as a component of a purge gas to achieve the removal of a dissolved gas and the dissolution of that gas utilized as a purge gas component through one operation.

For example, when carbon dioxide (carbonic acid gas) is used as a purge gas, the carbon dioxide dissolves in a liquid to be treated and the oxygen dissolved in the liquid is removed. The oxygen which has been thus removed from the liquid entrains with the excess carbon dioxide remaining undissolved and is discharged from the system. When a combination of carbon dioxide (carbonic acid gas) and nitrogen is used as a purge gas, the carbon dioxide mostly dissolves in the liquid and the nitrogen gas is discharged through an upper part of the packed column together with the oxygen which has been removed from the liquid. Consequently, the carbon dioxide introduced is utilized at an efficiency of nearly 100%.

Among the gases dissolved in a liquid, the gas which is required to be removed or diminished is oxygen in many cases. However, the processes of the present invention may be used for removing or diminishing other gases. In such cases, the principle of treatment is the same as in the removal of oxygen.

The purge gas for use in the present invention may be any gas which is different from the dissolved gas which is contained in the liquid to be treated and is to be removed or diminished. Examples thereof include inert gases, such as helium, argon, and the like, nitrogen ($N_2$), carbon dioxide ($CO_2$), and the like. Among these, nitrogen and carbon dioxide are preferred from the standpoints of profitability, handleability, and suitability for purposes of use.

As in the case of carbonated beverages, for example, the oxygen contained in the beverages is removed prior to canning or bottling in order to reduce corrosiveness and maintain the flavor. When carbon dioxide or a combination of carbon dioxide and nitrogen is used as a purge gas in practicing the present invention, carbon dioxide can be dissolved in the liquid simultaneously with deoxygenation.

When plural gases are used as a purge gas as in the case described above, these gases may be mixed before being fed or may be fed separately. For example, in the case of using carbon dioxide and nitrogen, the carbon dioxide and the nitrogen may be fed to a lower part of the packed column and to a packed bed slightly above that part, respectively.

This is because not only the purge gas feed process described above is effective in maximizing the concentration of carbonic acid gas (carbon dioxide) but also a satisfactory degassing effect can be obtained even when the purge gas for degassing is caused to act separately.

The process for removing a gas dissolved in a liquid according to the present invention will be explained by reference to the drawings.

In FIG. 3, a purge gas is introduced into a column through an inlet 6 for a purge gas installed in a lower part of the packed column. While the purge gas ascends through packed beds 3, it comes into countercurrent contact with a descending liquid to be treated in the regions packed with a packing and separated by a gas back mixing preventer plate 2. During the countercurrent contacting, the gas phase serves as a continuous phase. As a result, a gas dissolved in the liquid is removed. The resultant treated liquid is taken out of the system through an outlet 7 for a treated liquid.

While the liquid introduced through an inlet 4 for a liquid to be treated installed in an upper part of the column passes successively through the regions separated by the gas back mixing preventer plate 2, it comes into countercurrent contact with the purge gas. Namely, while the liquid descends, a gas dissolved therein is removed or diminished. The purge gas ascends in the column, and the residual purge gas remaining unabsorbed is discharged through an outlet 5 for a discharged gas together with the gas released from the liquid.

In the apparatus of the present invention, the degree of removal of a dissolved gas can be regulated according to purposes by installing at least two packed beds and controlling operating conditions therefor.

In the present invention, the apparatus is operated usually at atmospheric pressure. However, in the case of positively dissolving part of the purge gas in a liquid to be treated as in the process, it is preferred to elevate the pressure inside the packed column.

For example, when the present invention is used to remove dissolved oxygen in producing a carbonated beverage, a mixed gas composed of carbon dioxide and nitrogen as a purge gas is preferably used in that the nitrogen is effective in deoxygenation and the carbon dioxide can be dissolved in the liquid. As a result, the efficiency of purge gas utilization can be improved.

The present invention, which has been explained above, can be practiced alone in effectively removing a gas dissolved in a liquid, and of course, may be used in combination with a conventional technique for removing dissolved oxygen from the liquid, e.g., the vacuum degassing process and the like.

Next, indexes indicating the volatility of a substance from a liquid phase include Henry's constant, which is defined by the following equation (2):

$$p = Hx \tag{2}$$

x: molar fraction of the substance in the liquid phase (–)
p: partial pressure of the substance in the gas phase equilibrated with the liquid (atm)
H: Henry's constant (atm/mol fraction)

A stripping treatment is ideally conducted under conditions in which λ represented by the following equation (3) is around 1, from the standpoints of equilibrium and efficiency:

$$\lambda = \frac{L}{H(G/\pi)} \tag{3}$$

L: liquid flow rate (mol/m²h)
G: gas (or vapor) flow rate (mol/m²h)
π: total pressure (atm)

Consequently, when the volatile substance is highly volatile and its Henry's constant defined by equation (2) is, for example, about 1,000 atm/mol fraction, L/(G/π) is preferably about 1,000. However, since the gas amount in this system is extremely smaller than the amount of the liquid to be treated, an ordinary packed column, when used as it is, cannot have expected performances. This is because when the gas amount relative to the amount of the liquid is exceedingly small, the gas undergoes back mixing to make the countercurrent operation impossible, as discussed above.

In such a system, use of a conventional stripping column has the following problems. The column necessitates use of a large excess of a purge gas. As a result, the concentration of a target substance in the purge gas is low and the efficiency of recovery thereof is hence low. For example, when a target substance contained in a liquid is stripped therefrom with water vapor and the resultant stripping gas containing the target substance is condensed, then the concentration of the target substance in the condensate liquid is low and a further concentration operation is necessary for separating the target substance. In the case of stripping with air, adsorption with activated carbon or another adsorbent is necessary. Although the resultant stripping gas containing the target substance may be treated by incineration or the like, the gas should be heated in an exceedingly large amount to a heat decomposition temperature and this treatment is not energy-efficient.

In the present invention, the problems described above are eliminated by installing packed beds separated by a gas back mixing preventer plate in a column to bring a liquid to be treated into countercurrent contact with a purge gas while keeping the gas phase as a continuous phase and being prevented from undergoing back mixing. As a result, a volatile substance contained in the liquid can be efficiently stripped.

Examples of substances which can be effectively removed or diminished from liquids through stripping by the process according to the present invention include volatile organic substances, such as benzene, toluene, and the like, and volatile organic halogen substances, such as dichloromethane, trihalomethanes, and the like. Other substances, such as oxygen, carbon monoxide, hydrogen sulfide, and the like, may be effectively removed or diminished likewise so long as they have the same volatility. In the present invention, such substances are hence inclusively referred to as volatile substances. The present invention is especially effective when applied to a liquid containing any of the volatile organic substances enumerated above.

In the case of a substance having moderate volatility, the purge gas amount determined by equation (3) is relatively large. Consequently, an operation in which the effect of back mixing is negligible is possible even in a conventional apparatus, without the necessity of using an apparatus having gas back mixing preventer plates as in the present invention.

The limit of volatility of volatile substances thus strippable in conventional apparatus is such that the Henry's constant thereof is about 100 atm/mol fraction, which results in an L/G (or L/V) of about 100. Accordingly, it is preferred in the present invention that the volatile substance contained in the liquid have a Henry's constant of 100 atm/mol fraction or more.

Examples of the liquid to be treated in the present invention include waste waters and waste liquids. Although many of such liquids are aqueous solutions containing the volatile substances enumerated above, the stripping treatment of the present invention is applicable to various oily substances, organic solvents, and the like.

By the process according to one aspect of the present invention, a volatile substance contained in a liquid to be treated can be concentrated to a high degree. Specifically, when the volatile substance is highly volatile and has a sufficiently large Henry's constant, a large value of L/G is used to conduct the treatment. Consequently, water vapor is used as a purge gas to conduct the operation at a temperature around the boiling point of water. The resultant stripping vapor is cooled and condensed. Thus, the volatile substance can be concentrated to a high degree.

For example, when the volatile substance to be concentrated has a Henry's constant of 100 atm/mol fraction or 1000 atm/mol fraction, it can be concentrated about 100 times or about 1000 times, respectively.

When a volatile substance contained in a liquid to be treated is stripped with water vapor and recovered through condensation, the condensate liquid recovered separates into two phases when the amount of the recovered volatile substance exceeds the amount of the volatile substance which can dissolve in the recovered liquid. This is due to that the solubility of volatile substances in the liquid is generally not high and that high-degree concentration is possible in the process of the present invention.

As a result, a condensate liquid obtained, for example, by stripping a liquid to be treated containing 100 ppm benzene with water vapor according to the present invention separates into two phases. This organic phase can be easily recovered.

The process for removing a volatile substance in a liquid according to the present invention will be explained by reference to drawings.

In FIG. 3, a purge gas is introduced into a column through an inlet 6 for a purge gas installed in a lower part of the packed column. While the purge gas ascends through packed beds 3, it comes into countercurrent contact with a descending liquid to be treated in the regions packed with a packing material and separated by a gas back mixing preventer plate 2. During the countercurrent contacting, the gas phase serves as a continuous phase. As a result, a volatile substance contained in the liquid is stripped off. The resultant treated liquid is taken out of the system through an outlet 7 for a treated liquid.

While the liquid introduced through an inlet 4 for a liquid to be treated installed in an upper part of the column passes successively through the regions separated by the gas back mixing preventer plate 2, it comes into countercurrent contact with the purge gas. Namely, while the liquid descends, a volatile substance contained therein is removed or diminished by stripping. On the other hand, the purge gas ascends in the column and is discharged through a outlet 5 for a discharged gas together with the released volatile substance.

From the above description, it is obvious that the apparatus of the present invention can be extensively utilized for gas-liquid contacting operations, which are an elemental technique in various industries.

With recent demand changes, packed columns have come to be frequently used not for treating gases but for treating liquids. For example, there is a growing demand for the use of packed columns in producing or treating a liquid having certain properties (in many cases the liquid is water or an aqueous solution). Examples thereof include dissolving of ozone in water, to decompose an organic substance contained in water with ozone, removing of an organic substance contained in water by stripping with steam, removing oxygen contained in feed water and simultaneously bubble carbonic acid gas into the water, and the like. In designing columns for use in such applications, the column diameter is not always determined by gas load and is frequently determined by liquid load. As a result, the gas amount frequently comes to be exceedingly small.

Namely, it has become necessary to design columns in which u is 0.1 m/sec or less, in contrast to conventional columns in which u is from 1 to 2 m/sec. The gas-liquid contacting apparatus of the present invention is effective in gas-liquid contacting when the gas amount is smaller than the liquid amount, i.e., the gas/liquid ratio is small, as described above. The apparatus of the present invention can therefore be applied to various gas-liquid contacting operations in various industries.

The gas-liquid contacting apparatus according to the present invention is intended to be used in efficiently conducting gas-liquid contacting, which is a basic elemental technique. It can be used, for example, for causing a liquid to absorb a component of a gas or to release a component thereof into a gas, for causing a liquid to absorb a component of a gas and simultaneously to release a component thereof into the gas, or as a reactor for conducting a reaction in gas-liquid contacting.

By using the gas-liquid contacting apparatus according to the present invention, a gas-liquid contacting operation can be efficiently conducted, and apparatus for producing and generating a raw gas can be reduced. When the discharged gas should be treated, the apparatus is effective in reducing the load of the treatment.

According to the present invention, it becomes possible to provide a process for removing a gas dissolved in a liquid which is a novel process utilizing a packed column and an apparatus used therefor.

It is also possible to provide a process by which a gas dissolved in a liquid is removed, and simultaneously therewith, a gas different from the dissolved gas removed can be dissolved in the liquid at a high concentration, and an apparatus used therefor.

Furthermore, it becomes possible to provide a process by which a gas dissolved in a liquid can be removed without in vacuo heating as in conventional degassing processes, and a simple apparatus used therefor.

Moreover, it becomes possible to provide a novel process for efficiently removing, diminishing, or concentrating a volatile substance contained in a liquid through stripping in a packed column, and an apparatus used therefor.

Volatile substances, including organic halogen substances, dissolved in a liquid are present at low concentrations in many cases. When a conventional stripping column is used for treating the liquid, a large liquid/gas ratio cannot be used even for highly volatile substances because the gas undergoes back mixing in the column in operations employing a large liquid/gas ratio. As a result, the stripping gas should be used in an excessively large amount and a later treatment of the gas necessitates excessive facilities or a large amount of energy. In the processes of the present invention, the apparatus can be effectively operated using a gas amount exceedingly smaller than the liquid phase amount. Therefore, the processes are effective especially in the stripping of highly volatile organic substances, and it becomes possible to remove such organic substances from a liquid to be treated while attaining a high degree of concentration.

The apparatus of the present invention is intended to be used in efficiently conducting gas-liquid contacting, which is a basic elemental technique. It can be used, for example, for causing a liquid to absorb a component of a gas or to release a component thereof into a gas, for causing a liquid to absorb a component of a gas and simultaneously to release a component thereof into the gas, or as a reactor for conducting a reaction in gas-liquid contacting.

Specifically, the apparatus can be used for producing ozone water, in particular ozone water having a high ozone concentration. The ozone water obtained can be used for stripping of photoresist on silicon wafers or cleaning of silicon wafers or liquid crystals in the electronics industry, sterilization of production apparatus and instruments in the field of foods, sterilization of vegetables, medical instruments, and swimming pool water, and other applications. In gas-liquid contacting reactions using ozone as the gas, the apparatus is applicable, for example, to oxidative decomposition of organic substances in water, oxidative decomposition of COD substances in waste water, decoloring of colored waste water, bleaching of pulps in the pulp industry, and the like.

The apparatus can be further used for the removal of organic and other substances from waste water by stripping. For example, it can be used for removing chloroform, benzene, toluene, xylene, and the like from waste water and for removing or diminishing odorous substances, such as hydrogen sulfide, methyl mercaptan, dimethyl sulfide, and the like, from odorous waste water. Furthermore, the apparatus is utilizable for removing oxygen from drinking water, boiler water, carbonated water, or the like and for dissolving carbonic acid gas or another gas in a liquid.

The present invention is usable in applications such as degassing, deoxygenation and the like of cleaning water for semiconductors or precision machine parts, water to be fed to boilers, cooling water for power plants, water for food cleaning or processing, tap water, various drinking waters, and the like.

The present invention relates to processes of treating a volatile substance dissolved in a liquid. These processes can be used for removing or recovering volatile substances, through stripping, from various industrial waste water discharged from chemical factories and other facilities. The present invention is effective in efficiently stripping a volatile substance from a liquid to be treated and is a technique contributing to environmental protection.

The present invention will be explained below with the following Examples; however, it is not limited thereto.

EXAMPLE 1

Production of Ozone Water

Ozone water, which has recently come to be used, for example, for the sterilization of tap water or swimming pool water and for the sterilization of foods, is mostly produced so as to have an ozone concentration as low as about 1 mg/l (hereinafter ppm is used in place of mg/l). In producing such ozone water having a low ozone concentration, use of a bubbling vessel or ejector arouses no practical troubles.

However, in producing ozone water having a low ozone concentration, such as that having an ozone concentration exceeding 5 ppm, the demand for which is increasing, the degree of ozone utilization is exceedingly low when a conventional bubbling vessel or ejector is used as it is. For example, in producing ozone water having a high ozone concentration of 15 ppm, the amount of ozone absorbed, i.e., ozone recovery rate, was as low as about 10%, and about 90% of the ozone which had been fed was discharged. In producing ozone water having a high ozone concentration of 8 ppm for use in vegetable sterilization, the ozone recovery rate was 19%.

First, an ejector is selected as a conventional bubbling gas-liquid contacting apparatus and an explanation will be given below on theoretical and observed values of recovery therefor.

The theoretical recoveries in producing 10 ppm ozone water under the conditions of water temperatures of 20° C. and 5° C. are calculated. The ozone concentration in the inlet gas introduced into the apparatus was taken as 100 g/Nm$^3$.

The Henry's constants (H) for an ozone-water system at 20° C. and 5° C. are H=3760 and H=2180 (atm/mol fr), respectively.

The gas-phase ozone concentration y (mol ppm) is represented by equation (4) when the liquid-phase ozone concentration x is 10 ml/l, i.e., 3.75 mol ppm.

$$y = H_x \tag{4}$$

From equation (4) and the Henry's constants, the values of y are calculated.

$$Y = 3760 \times 3.75 \times 10^{-6} \times 10^3 \times 48/22.4 = 30 \; gO_3/Nm^3 \; (20° \text{ C.}) \tag{5}$$

$$y = 2180 \times 3.75 \times 10^{-6} \times 10^3 \times 48/22.4 = 17.4 \; gO_3/Nm^3 \; (5° \text{ C.}) \tag{6}$$

When the inlet gas has an ozone concentration of 100 gO$_3$/Nm$^3$, the outlet gas has an ozone concentration of 30 gO$_3$/Nm$^3$ at a water temperature of 20° C. Since the relationship (total gas amount (O$_3$+O$_2$))=(inert gas amount (O$_2$)) roughly holds, the amount of ozone which has dissolved in water per Nm$^3$ of the inert gas is 100−30=70 g. Hence, the theoretical ozone recovery rate is 70%.

When 10 ppm ozone water was produced at a water temperature of 20° C., the observed value of ozone recovery rate was 15%. This value is considerably smaller than the theoretical recovery of 70%. The results show that the ejector, in which a small amount of bubbles are brought into contact with water for a short time period, is a contactor in which the value of $K_L a$ is exceedingly small.

A comparison between theoretical and observed values of recovery in the case of producing 1 to 30 ppm ozone water in the same manner is summarized in Table 1.

TABLE 1

| | Water temp. | Ozone concentration in ozone water | | | | |
|---|---|---|---|---|---|---|
| | | 1 ppm | 8 ppm | 10 ppm | 15 ppm | 30 ppm |
| Theoretical | 5° C. | 98% | | 83% | | 48% |
| Theoretical | 20° C. | 97% | | 70% | | 10% |
| Found | 20° C. | | 19% | 15% | 11% | |

Table 1 shows that the theoretical ozone recovery rate decreases as the temperature (water temperature) ascends and as the ozone concentration in the ozone water increases.

In producing, for example, ozone water having an ozone concentration of 10 ppm (=10 mg/l=10 g/m$^3$), the theoretical total gas amount necessary per a liquid amount of 100 m$^3$/hr is 10 Nm$^3$/hr when the ozone concentration in the gas is 100 g/Nm$^3$. In this case, when the liquid load is taken as 50 m$^3$/m$^2$hr, the gas velocity is U≅u=0.0014 m/sec. This value is exceedingly small, i.e., not larger than one-hundredth the gas velocity u of 1 m/sec for ordinary packed columns. In this case, since the remainder of the ozone-containing gas, i.e., the inert gas, is usually air or oxygen, it may be thought that U=u when the pressure is 1 atm. For example, when the pressure is elevated to 2 atm, the density-corrected gas velocity u is u=0.0014×2$^{0.5}$=0.002 m/sec.

Next, a column gas-liquid contacting apparatus of the present invention was used to conduct ozone recovery rate tests in which the ozone concentration in the outlet ozone water was regulated to 10 ppm. The ozone recovery rate was determined in each test. Some of these tests are comparative ones.

Gas back mixing preventer plates as shown in FIG. 2 were used. The open rate of gas passage holes in the gas back mixing preventer plates was changed by regulating the hole diameter of the gas risers.

Column diameter: 30 cm
Packing:
    No. 0.5 Raschig Super-Ring® (produced by Raschig Co.)
Total packing height: 200 cm
Installation interval for gas back mixing preventer plates/ number of packed beds:
    20 cm/10; 40 cm/5; and 200 cm/1 (the "number of packed beds" means the number of packed beds installed in the column)
Ozone concentration in inlet gas: 100 g/Nm³ and 250 g/Nm³
Pressure: 1 atm and 2 atm
Water temperature: 20° C.
Open rate of gas passage holes in gas back mixing preventer plates: 0.05% and 10%

These conditions were combined as shown in Table 2 to conduct ozone water production experiments. In all these experiments, the ozone concentration in the outlet ozone water was regulated to the same value, i.e., 10 ppm (mg/l).

TABLE 2

| No | Bed interval (cm)/bed number | H/D | Pressure (atm) | Open rate of gas passage holes (%) | Ozone concentration in inlet gas (g/Nm³) | Ozone concentration in outlet water (mg/l) | Ozone recovery rate (%) |
|---|---|---|---|---|---|---|---|
| 1 | 20/10 | 0.67 | 1 | 0.05 | 100 | 10 | 95 |
| 2 | 40/5 | 1.33 | 1 | 0.05 | 100 | 10 | 80 |
| 3 | 200/1 | 6.67 | 1 | 0.05 | 100 | 10 | 55 |
| 4 | 20/10 | 0.67 | 1 | 10 | 100 | 10 | 64 |
| 5 | 20/10 | 1.33 | 2 | 0.05 | 250 | 10 | 98 |

A comparison among Run Nos. 1 to 3 reveals influences of H/D ratio on back mixing and ozone recovery. A comparison between Run Nos. 1 and 4 shows influences of the open rate of gas passage holes. Run No. 5 was conducted in order to ascertain influences of the pressure inside a packed column on ozone recovery.

Influence of H/D Ratio

In Run No. 3 (Comparative Example), only one packed bed having a height of 200 cm was used. In view of the column diameter of 30 cm, that height is not so high as to result in mal-distribution of liquid distribution, and is generally not so high as to necessitate a liquid redistributor. Consequently, the constitutions in Run Nos. 1 and 2, wherein the installation intervals for gas back mixing preventer plates are 20 cm (ten beds) and 40 cm (five beds), respectively, are thought to have too many beds, when judged based on the general idea on conventional liquid redistributors, and hence have too small a height of each packed bed, i.e., an excessively small H/D ratio. Namely, such designs have been regarded as irrational designs necessitating an increased equipment cost uselessly.

However, the ozone recovery rate in Run No. 1 was 95%, whereas that in Run No. 3 as a Comparative Example was 55%. It was thus found that Run No. 1 could recover ozone in a larger amount than Run No. 3 by 70% or more. This increase in ozone recovery rate is attributable to the fact that the gas back mixing preventer plates functioned not as liquid redistributors but to prevent gas back mixing flows.

In Run No. 2, the ozone recovery rate was 80%. This value of ozone recovery rate was lower than the ozone recovery rate in Run No. 1 but higher than that in Run No. 3 (Comparative Example).

When gas residence time is used in place of gas velocity, an easier understanding is possible.

In ordinary packed columns, a gas resides therein for only several seconds due to that the gas velocity is high. In contrast, in this Example, the gas residence time was about 30 to 60 minutes depending on the ozone recovery rate. During this residence time, the gas, which was almost in a stationary state, was completely mixed within the column and this mixing prevented countercurrent contacting, which is an operation indispensable for mass transfer in physical absorption. As a result, a low recovery was obtained as in Run No. 3.

Run No. 3 was an almost complete-mixing system, and the theoretical recovery in this case was 70% as shown in Table 1. The observed value of ozone recovery rate in Run No. 3 was 55%, which was close to the theoretical value.

For the purpose of comparison, an ejector was operated under the same conditions (pressure: 1 atm; water temperature: 20° C.; ozone concentration in ozone water: 10 mg/l). As a result, the observed value of ozone recovery rate was 15% (see Table 1). From the results of Run No. 3, it can be understood that even the ordinary packed column gave a higher ozone recovery rate than the ejector.

This is due to that, as explained hereinabove, the gas residing in the packed bed in the packed column constituted a continuous phase so that the packed column could have a larger value of $K_L a$ than the ejector.

Influence of Open Rate of Gas Passage Holes

The gas back mixing preventer plates used in Run No. 4 were regulated so as to have a open rate of gas passage holes of 10%; in the ordinary liquid redistributors for use in packed columns, the value of 10% is relatively small for the percentage of holes therein. As a result, the ozone recovery rate was 64%, which was slightly better than the recovery of 55% in Run No. 3, in which no gas back mixing preventer plate was installed.

However, a comparison between that value and the ozone recovery rate of 95% in Run No. 1 shows that back mixing occurred evidently. Namely, it can be understood that due to the high open rate of gas passage holes of 10%, the gas ascended and descended through these gas passage holes, i.e., the gas in the column was vertically mixed and stirred so that the countercurrent operation was prevented.

Influence of Pressure

In conducting gas-liquid contacting in a packed column, increasing the pressure facilitates gas dissolution. It was ascertained that in Run No. 5, in which an elevated pressure was used, the ozone recovery rate was 98%, which was higher than the recovery of 95% in Run No. 1.

EXAMPLE 2

Deoxygenation of tap water was conducted at normal pressure using an apparatus for dissolved-gas removal which had the same constitution as that shown in FIG. 3, except that the number of packed beds in the column was 10.

In a column having a diameter of 10 cm were installed ten packed beds (each having a height of 19 cm) by installing eleven gas back mixing preventer plates shown in FIG. 2 at an interval of 20 cm and filling the spaces between these plates with Raschig Super-Ring as a packing.

Tap water (having a temperature of 25° C.) was fed through an inlet 4 for a liquid to be treated installed in an upper part of the column, while nitrogen or carbon dioxide was fed as a purge gas to a lower part of the column. The results obtained are shown in Table 3.

TABLE 3

| No | Packed bed number | Water amount (1/h) | Oxygen concentration in inlet water (ppm) | Kind and feed rate of purge gas (N1/h) | | Oxygen concentration in outlet water (ppm) |
|---|---|---|---|---|---|---|
| 6 | 10 | 170 | 7.7 | $N_2$ | 100 | 0.07 |
| 7 | 10 | 170 | 7.7 | $N_2$ | 50 | 0.43 |
| 8 | 10 | 170 | 7.7 | $CO_2$ | 150 | 0.10 |

(Note) In the experiment of Run No. 8, the amount of $CO_2$ discharged as an outlet gas was about 25 Nl/h due to that the $CO_2$ introduced had been partly absorbed and dissolved in the water.

EXAMPLE 3

Using an apparatus having the same constitution as in Example 2, i.e., having ten packed beds, deoxygenation of tap water was conducted simultaneously with dissolution of carbon dioxide. A combination of carbon dioxide and nitrogen was used as a purge gas in the following two manners. In one case, carbon dioxide was mixed beforehand with nitrogen and this mixture was introduced through the lower part of the packed column. In the other case, carbon dioxide was introduced through the lower part of the packed column and nitrogen was introduced into the third packed bed from the bottom of the packed column. The results obtained are shown in Table 4.

TABLE 4

| No | Packed bed number | Water amount (1/h) | Oxygen concentration in inlet water (ppm) | Kind and feed rate of purge gas (N1/h) | | Oxygen concentration in outlet water (ppm) |
|---|---|---|---|---|---|---|
| 9 | 10 | 170 | 7.7 | $N_2$ | 30 | 0.15 |
| | | | | $CO_2$ | 120 | |
| 10 | 10 | 170 | 7.7 | $N_2$ | 30 | 0.10 |
| | | | | $CO_2$ | 120 | |

(Note) In the experiments of Run Nos. 9 and 10, most of the $CO_2$ was absorbed and dissolved and only a slight proportion thereof was discharged as an outlet gas.

Furthermore, the apparatus was operated under the same conditions as that carbon dioxide and nitrogen were introduced through the lower part of the packed column, except that the pressure inside the column was elevated to a gauge pressure of 1 kg/cm², i.e., about 2 atm, and carbon dioxide and nitrogen were fed as a purge gas at rates of 240 l/h and 60 l/h, respectively. As a result, a carbonated water having a carbon dioxide concentration of 0.3% and a dissolved oxygen concentration of 0.1 ppm was obtained. The efficiency of carbon dioxide utilization was about 99%.

EXAMPLE 4

Using the apparatus shown in FIG. 3, 1,1,1-trichloroethane (TCE) contained in a liquid to be treated was stripped at normal temperature.

The packed column had a diameter of 10 cm and contained ten packed beds formed by installing eleven gas back mixing preventer plates shown in FIG. 2 so as to result in a height of each bed of 20 cm and filling the spaces between these plates with Raschig Super-Ring as a packing.

The liquid to be treated 4 was a liquid (25° C.) containing 1,1,1-trichloroethane in an amount of about 100 ppm. Air was used as a purge gas 6. The results obtained are shown in Table 5. 1,1,1-Trichloroethane has a Henry's constant (25° C.) of about 1200 atm/mol fraction. The amount of the discharged gas was not measured as in normal operations.

TABLE 5

| | Liquid | | Gas | |
|---|---|---|---|---|
| | water amount (kg/h) | TCE concentration (ppm) | Air amount (N1/h) | TCE concentration (vol %) |
| Feed | 200 | 103 | 240 | — |
| Discharge | 200 | <0.1 | not measured | 1.4 |

The molar fraction of 1,1,1-trichloroethane increased from $1.39 \times 10^{-5}$ in the feed water to 0.014 in the discharged gas. The results show that about 1000 times concentration occurred.

The 1,1,1-trichloroethane contained in the discharged gas may be recovered with an normal solvent recovery apparatus employing activated carbon or may be completely decomposed with an incinerator. These processes are both economically useful due to that the discharged gas has a high concentration.

The purge gas may be a nitrogen or another gas. In this Example, stripping was conducted with air due to that the lower limit of inflammability of 1,1,1-trichloroethane in air is 8 vol %. However, it is a matter of course that volatile substances which are highly dangerous should be stripped with an inert gas, such as nitrogen or the like.

EXAMPLE 5

Figure 5:
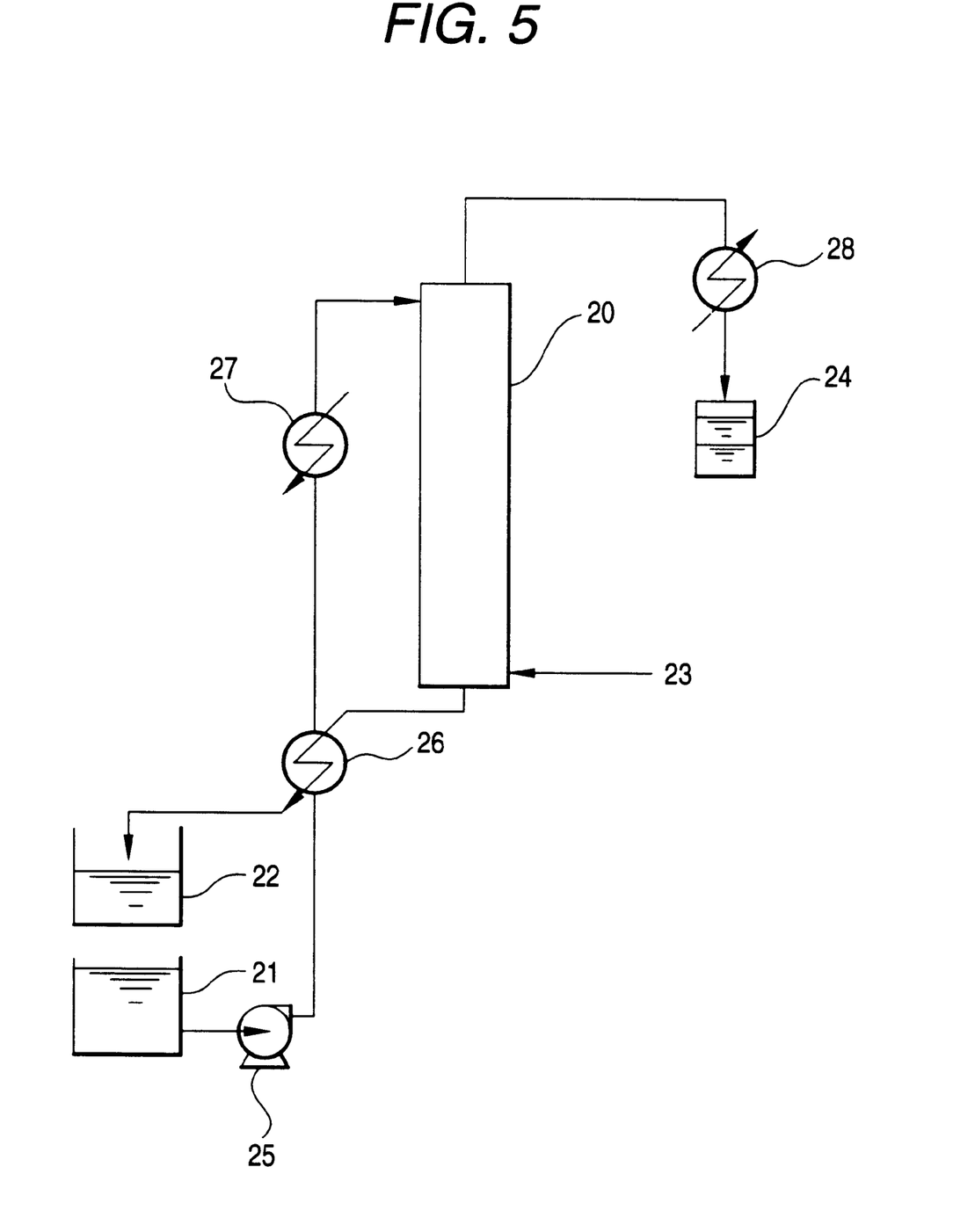
FIG. 5 is a simplified flow diagram illustrating the process of treatment for use in Example 5 according to the present invention.

Using an equipment illustrated by the flow diagram shown in FIG. 5 which contained the same packed column as used in Example 4, a liquid containing benzene or dichloromethane was subjected to stripping with water vapor and the solvent was recovered.

In the equipment shown in FIG. 5, the raw-liquid is heated to about 100° C. with heat exchangers 26 and 27 and then fed to the packed column 20, where the liquid is caused to flush and strip out the volatile substance into the purge gas. Thereafter, the treated liquid is discharged through the treated-liquid discharge opening and sent to the heat exchanger 26, where a part of the heat possessed by the treated liquid is transferred to the raw liquid to be treated. After the treated liquid is thus cooled, it is sent to a treated-liquid tank 22. On the other hand, water vapor as a purge gas is fed through an inlet 23 for a purge gas, and the vapor which has passed through the packed column and contains the organic substance released from the liquid through volatilization is discharged through the discharged gas outlet. This vapor is cooled and condensed with a heat exchanger 28, recovered, and placed in a recovered-liquid tank 24.

Into the recovered-liquid tank 24, the volatile substance and the water used as stripping water vapor are recovered. When the amount of this volatile substance present in the tank exceeds the amount of the substance which can dissolve in the recovered liquid, the liquid in the tank separates into two phases. This is attributable to the fact that the solubility of the volatile substance in the liquid is not high and that high-degree concentration is possible in this treatment.

In this Example, a liquid containing benzene or dichloromethane in an amount of about 100 ppm was used as the liquid to be treated. In this treatment with the packed column of the present invention, sufficient concentration could be conducted due to that a large liquid/gas ratio could be used. As a result, the recovered liquid separated into two phases.

The results of the treatment of the liquid to be treated containing benzene are shown in Table 6, while those of the treatment of the liquid to be treated containing dichloromethane are shown in Table 7. Benzene and dichloromethane have Henry's constants (25° C.) of 308 and 136 atm/mol fraction, respectively.

TABLE 6

|  |  | Flow rate (kg/h) | Benzene conc. (ppm) |
|---|---|---|---|
| Feed | Raw water | 200 | 104 |
|  | Water vapor | 0.16 | — |
| Discharge water |  | 200 | <0.1 |
| Recovered | Organic phase | 0.02 | — |
| liquid | Aqueous phase | 0.14 | 1500 |

TABLE 7

|  |  | Flow rate (kg/h) | Dichloromethane conc. (ppm) |
|---|---|---|---|
| Feed | Raw water | 200 | 103 |
|  | Water vapor | 0.2 | — |
| Discharge water |  | 200 | <0.1 |
| Recovered | Organic phase | 0.017 | — |
| liquid | Aqueous phase | 0.18 | 18000 |

By separating the organic phase from the recovered liquid, the volatile substance could be recovered.

The aqueous phase contains part of the volatile organic substance dissolved therein. However, this phase may be returned to the line of the liquid to be treated, as in operations conducted frequently. As a result, the concentration of the volatile substance in the liquid increases and, hence, almost all the volatile substance can be recovered.

In this Example, the heat exchanger 26 was used for energy saving to use the heat possessed by the discharge liquid as a part of the heat energy for heating the liquid. However, the discharge liquid need not be used for heating the liquid when this is not costly from the standpoint of energy saving.

While the invention has been described in detail and with reference to specific embodiments thereof, it will be apparent to one skilled in the art that various changes and modifications can be made therein without departing from the spirit and scope thereof.

This application is based on Japanese patent application Nos. Hei 11-267579 filed on Aug. 18, 1999, Hei 11-338321 filed on Oct. 25, 1999 and 2000-104078 filed on Feb. 18, 2000, the entire contents of which are incorporated hereinto by reference.

What is claimed is:

1. A gas-liquid contacting apparatus of a column system, comprising a column having an inlet for introducing a liquid to be treated and an outlet for a discharged gas in an upper part thereof, and an inlet for introducing a gas and an outlet for a treated liquid after gas-liquid contact in a lower part thereof, and at least two units comprising a packing material or a wetted wall structure, said units being separated by a gas back mixing preventer plate between the upper and lower parts, wherein the liquid introduced and the gas introduced are brought into countercurrent contact while keeping the gas phase as a continuous phase, wherein consecutive gas back mixing preventer plates are installed at vertical-direction intervals for preventing gas back mixing.

2. The apparatus according to claim 1, wherein the gas back mixing preventer plates are installed at an interval H of 2 m or less, the ratio H/D is 5 or less, wherein D represents a diameter of the column, and the gas back mixing preventer plates have a gas passage hole in an amount of 5% or less, in terms of the percentage of the total area of all gas passage holes, to the cross-sectional area of the column.

3. The apparatus according to claim 1, wherein the unit comprises a packing material.

4. The apparatus according to claim 1, wherein the gas back mixing preventer plate is a plate comprising gas passage holes and liquid passage holes, and the packing material is supported by the gas back mixing preventer plate.

5. The apparatus according to claim 1, wherein the gas back mixing preventer plate is a plate comprising gas passage holes and liquid passage holes, and the packing material is supported by a support other than the gas back mixing preventer plate.

6. The apparatus according to claim 1, wherein said apparatus is adapted for operating at a density-corrected superficial gas velocity of 0.1 m/sec or less.

7. A process for producing an ozone liquid, comprising introducing a liquid into an upper part of a column comprising at least two units comprising a packing material or a wetted wall structure, said units being separated by a gas back mixing preventer plate, introducing an ozone gas into a lower part of the column, and bringing the liquid into countercurrent contact with the ozone gas while keeping the gas phase as a continuous phase.

8. The process according to claim 7, wherein the liquid is pure water or ultra pure water.

9. The process according to claim 7, wherein said process is carried out at a density-corrected superficial gas velocity of 0.1 m/sec or less.

10. A process for oxidizing an organic substance in a liquid, comprising introducing a liquid to be treated into an upper part of a column comprising at least two units comprising a packing material or a wetted wall structure, said units being separated by a gas back mixing preventer plate, introducing an ozone gas into a lower part of the column, and bringing the liquid into countercurrent contact with the ozone gas while keeping the gas phase as a continuous phase.

11. The process according to claim 10, wherein said process is carried out at a density-corrected superficial gas velocity of 0.1 m/sec or less.

12. A process for removing a gas dissolved in a liquid, comprising introducing a liquid to be treated into an upper part of a column comprising at least two units comprising a packing material or a wetted wall structure, said units being separated by a gas back mixing preventer plate, introducing a purge gas into a lower part of the column, and bringing the liquid into countercurrent contact with the purge gas while keeping the gas phase as a continuous phase to remove a gas dissolved in the liquid.

13. The process according to claim 12, wherein the gas dissolved is oxygen, and the purge gas is nitrogen and/or carbon dioxide.

14. The process according to claim 12, wherein said process is carried out at a density-corrected superficial gas velocity of 0.1 m/sec or less.

15. A process for removing a gas dissolved in a liquid, comprising introducing a liquid to be treated into an upper part of a column comprising at least two units comprising a packing material or a wetted wall structure, said units being separated by a gas back mixing preventer plate, introducing a purge gas into a lower part of the column, and bringing the liquid into countercurrent contact with the purge gas while keeping the gas phase as a continuous phase to remove a gas dissolved in the liquid and dissolve the purge gas in the liquid.

16. The process according to claim 15, wherein the gas dissolved in the liquid is oxygen, and the purge gas is carbon dioxide or a combination of carbon dioxide and nitrogen.

17. The process according to claim 15, wherein said process is carried out at a density-corrected superficial gas velocity of 0.1 m/sec or less.

18. A process for treating a volatile substance in a liquid, comprising introducing a liquid to be treated into an upper part of a column comprising at least two units comprising a packing material or a wetted wall structure, said units being separated by a gas back mixing preventer plate, introducing a purge gas into a lower part of the column, and bringing the liquid into countercurrent contact with the purge gas while keeping the gas phase as a continuous phase to strip the volatile substance from the liquid.

19. The process according to claim 18, wherein the volatile substance is a volatile organic substance.

20. The process according to claim 18, further comprising cooling and condensing a stripping vapor containing the stripped volatile substance, and concentrating and recovering the volatile substance, wherein the purge gas is water vapor.

21. The process according to claim 18, wherein said process is carried out at a density-corrected superficial gas velocity of 0.1 m/sec or less.

* * * * *